United States Patent Office 2,857,358
Patented Oct. 21, 1958

2,857,358

UNSATURATED POLYESTER RESIN COMPOSITION CONTAINING AS A CATALYTIC PROMOTER ALKYL AMINO STYRENES

Walter M. Thomas, Springdale, Conn., assignor to American Cyanamid Company, New York, N. Y., a corporation of Maine No Drawing. Application March 24, 1954
Serial No. 418,465

9 Claims. (Cl. 260—45.4)

This invention relates to polyester resinous compositions. More particularly this invention relates to the polymerization (cure) of polymerizable unsaturated polyester resinous compositions wherein a small but effective amount of a catalyst promoter is employed. Additionally this invention relates to polymerizable unsaturated polyester resinous compositions, their manner of production and articles produced therefrom.

It is well known to prepare polymerizable polyester resinous compositions by reacting unsaturated polycarboxylic acids and polyhydric alcohols. These polymerizable unsaturated polyesters may then find use in themselves or they may be made to polymerize with a compound containing a polymerizable $CH_2=C<$ group. The latter compositions find many uses in the production of castings, laminations and the like. In initiating the polymerization of the polymerizable unsaturated polyester and the polymerizable compound, it is customary to employ a polymerization catalyst in the reaction mixture. Heat is applied to the mixture and the polymerization or cure is thereby effected. Temperatures within the range of from about 25° C. to 125° C. are customarily employed in carrying out the polymerization of the mixture. At these elevated temperatures several objections, not only to the polymerization reaction but also to the cured product, are often present. For instance, at these high temperatures the polymerization rate is so fast and the exothermic action of heat so great that the resulting stresses and strains developed often result in a cured resinous composition which may be cracked or badly crazed.

I have now found that the cure of polymerizable unsaturated polyester resinous compositions with a polymerizable compound containing a polymerizable $CH_2=C<$ group may be effected with a conventional catalyst, as is well known in the art, at low temperatures by the employment of a polymerization catalyst promoter which will be discussed more fully hereinbelow. By initiating the cure of the resinous materials with a conventional catalyst in combination with the catalytic promoters in accordance with my invention, a controllable and practical curing cycle is obtained.

It is an object of my invention to polymerize (cure) unsaturated polyester resinous compositions with a compound containing a polymerizable $CH_2=C<$ group. It is a further object of my invention to effect said cure by the employment of a polymerization catalyst promoter. These and other objects of my invention will be discussed more fully hereinbelow.

In the preparation of the polymerizable unsaturated polyester resinous compositions of my invention, one may make use of the ethylenically unsaturated polycarboxylic acids such as maleic, fumaric, aconitic, itaconic, and the like. The ethylenically unsaturated polycarboxylic acids include those known as the alpha, beta unsaturated acids. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, i. e., those which are free of nonbenzenoid unsaturation, one could use such acids as phthalic, malonic, succinic, glutaric, sebacic, and the like, but in amounts less than a larger proportion of the total amount of polycarboxylic acid present. Whenever available, the anhydrides of these acids may be used, e. g., maleic anhydride, phthalic anhydride, and as used herein polycarboxylic acids include the polycarboxylic anhydrides when available. Also, mixtures of the acids and anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in my invention are: ethylene glycol; diethylene glycol; propylene glycol; dipropylene glycol; butanediol-1,4; butanediol-1,3; butanediol-1,2; pentanediol-1,4; pentanediol-1,5; hexanediol-1,6; and the like. Additionally, such polyhydric alcohols as glycerol, 1 - 1' - isopropylidenebis(p - phenylenoxy)di - 2-propanol, pentaerythritol, dipentaerythritol, and the like may be used in my invention.

In the preparation of the polymerizable unsaturated polyesters, one may use the polyhydric alcohols and the polycarboxylic acids in a proportion substantially equally about mol for mol and preferably an excess of alcohol approximating 10% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and, preferably, an acid number from about 35 to 40. The polymerizable unsaturated polyesters are admixed with a monomeric compound containing the polymerizable $CH_2=C<$ group to give a composition that may be cured to a stable thermoset condition. One may use from about 10 parts by weight of the monomeric material to about 90 parts of the unsaturated polyester resin up to about 80 parts of the monomeric material to about 20 parts of the polymerized unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in my invention are such as styrene, side-chain alkyl and halo substituted styrenes such as alpha methylstyrene, alpha chlorostyrene, alpha ethylstyrene and the like or alkyl and halo ring-substituted styrene such as ortho, meta and paraalkyl styrenes such as o-methylstyrene, p-ethylstyrene, m-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alpha-hydroxyisobutyrate, allyl trichloro-silane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silicate, tetraallyl silane, hexallyl disiloxane and the like.

In the formulation of the resinous composition of my invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst employed may vary over rather wide limits to give varying catalyzed stability. Thus, from about 0.01% to about 10% by weight based on the total weight of the polymerizable composition may be used. Preferably, from about 0.05% to about 1% by weight of the catalyst based on the total weight of the polymerizable resinous composition gives the desired results. It is obvious that other proportions of the catalyst may be utilized when a faster or slower rate of cure is desired. Examples of the organic peroxide catalyst that may be used in my invention are such as benzoyl peroxide, succinyl peroxide, acetyl peroxide, methylethyl ketone peroxide, cumene hydroperoxide, tertiarybutyl hydroperoxide, cyclohexanone peroxide, perbenzoic acid, peracetic acid, anisoyl peroxide, toluyl peroxide, p-bromobenzoyl, tertiarybutyl perbenzoate, p-methane hydroperoxide, pinane hydroperoxide, diisopropylbenzene hydroperoxide, 1-cyclohexanol-1-hydroperoxide, furoyl peroxide and chloracetyl peroxide or any organic ozonide, such as diisopropylene ozonide, or a mixture of such substances may be used as the curing catalyst.

In order to control the rate of polymerization during the cure of the resinous compositions of my invention, it is advantageous to add a moderate amount of an inhibiting agent to the composition. The amount of inhibiting agent used is that required to give a minimum storage stability to the uncatalyzed mixture. Examples of inhibiting agents that may be used in my invention are such as hydroquinone, pyrogallol, tannic acid, tertiarybutyl catechol, or an organic amine such as aniline or phenylene diamine. Mixtures of the inhibiting agents may also be used if desired. About 0.008% of inhibiting agent by weight, based on the total weight of the resinous composition, usually gives satisfactory results.

In order to obtain the desired cure of the resinous compositions of my invention, it is necessary that a small but effective amount of promoter for the catalyst be present in the reaction mixture. I have discovered that, when an aryl compound represented by the general formula

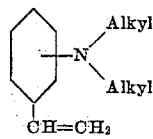

or a polymer thereof is added to the reaction mixture, a controllable and practical curing cycle is obtained. The alkyl radicals present in the above general formula may contain from one to four carbon atoms. Thus, compounds falling within the scope of said general formula are such as dimethylaminostyrene, diethylaminostyrene, dipropylaminostyrene, dibutylaminostyrene, and the like. Other groups which will not destroy the promoting activity of the compound represented by the general formula may also be present. Such groups are the aldehyde group, the phenolic hydroxyl group and the azo group. However, such groups as nitro and nitroso must not be present in the compound inasmuch as these groups inhibit rather than promote polymerization at the temperatures employed for the cure of the resinous compositions. While the compound represented by the general formula set forth above may be employed by itself as the catalyst promoter, I have found that a polymer of the compound may also be employed in order to obtain the desired promoting effect. Thus, the compound may be polymerized with another compound containing a polymerizable $CH_2=C<$ group to form a polymer that finds use herein. Among the monomeric materials that may be employed to form the polymer are such as those that have been mentioned hereinbefore that find employment as monomers suitable for polymerization with the polymerizable unsaturated polyesters. Other materials that may also be employed are such as acrylonitrile and the acryiates, e. g., methylacrylate, ethylacrylate, butylacrylate, ethylmethylacrylate, etc. It is only necessary that the polymer of the compound represented by the general formula be soluble in either the polymerizable unsaturated polyester and/or the monomeric material with which the polyester is polymerized. The preferred polymer of the compound represented by the general formula is with styrene. This polymer is readily soluble in styrene and can then be added to the polymerization mixture.

From about 0.005% to about 0.2% by weight of the catalyst promoter, based on the total weight of the resinous composition, may be employed in accordance with my invention. Generally, however, from about 0.01% to about 0.1% of the promoter is satisfactory. The promoter may be introduced into the resinous composition at any point prior to the cure thereof. After the promoter has been introduced into the composition, the desired catalyst is then also introduced therein and the resinous material cured. I have found that an effective process for introducing the promoter into the resinous composition is to dissolve it in a suitable solvent and then to stir this solution into the uncured composition. Inasmuch as the presence of a catalyst in the material would cause a spontaneous cure, it is necessary that the catalyst not be introduced into the composition until just prior to its cure. Obvious advantages of employing the catalyst promoters of my invention readily present themselves. For instance, when the promoter utilized is a monomeric compound, not only is the cure of the resinous composition initiated but also the promoter may enter into the polymeric material formed. The use of a polymer of the promoter in effecting cure of the resinous composition is especially desirable during the cure of sections wherein a normally volatile promoter would be driven off due to the exothermic heat of cure. Inasmuch as a polymer of the promoter is non-volatile, it is not volatilized during the cure of material and remains effective therein throughout the cure or polymerization of the resinous composition.

In order that those skilled in the art may more fully understand the inventive concept herein presented, the following examples are given by way of illustration and not limitation unless so noted in the appended claims. All parts are by weight.

*Example 1*

A polymerizable unsaturated polyester was prepared by reacting 6.6 mols of propyleneglycol, 3.0 mols of phthalic anhydride and 3.0 mols of maleic anhydride under an atmosphere of carbon dioxide and at an elevated temperature until an acid number of between 35 and 40 was obtained. 72 parts of the polyester were then combined with 36.2 parts of styrene. A fast curing resinous composition was obtained by employing as the catalyst 2% by weight of benzoyl peroxide and 0.02% by weight of dimethylaminostyrene as the catalyst promoter.

*Example 2*

A polymerizable unsaturated polyester was prepared by reacting 667 parts of diethyleneglycol, 232 parts fumaric acid and 584 parts of adipic acid under an inert atmosphere of nitrogen and at an elevated temperature until an acid number of between 15 and 20 was obtained. One part of the polyester was then combined with two parts of methylstyrene. In order to obtain a rapid curing composition, the mixture was catalyzed with 2% by weight of benzoyl peroxide and as the promoter 0.02% by weight of a copolymer of dimethylaminostyrene and styrene.

*Example 3*

The resinous composition prepared in accordance with Example 1 was catalyzed with 1% by weight of benzoyl peroxide. In order to show the promotive effect of the compounds of the present invention, a like sample was prepared to which was added 0.02% by weight of the promoter dimethylaminostyrene. The resulting decrease in gel time at 25° C. is shown in the table set forth below.

*Example 4*

To 50 parts of the polymerizable unsaturated polyester prepared in accordance with Example 1 was added 100 parts of styrene. Two portions of this resinous composition were then catalyzed with 1% benzoyl peroxide. One portion contained in addition as a promoter 0.02% by weight of a dimethylaminostyrene-styrene copolymer. The resulting reduction in gel time at 25° C. is also set forth in the table below.

| Resin Example | Catalyst | Promoter | 25° C. Gel Time |
|---|---|---|---|
| 3 | 1% Benzoylperoxide | None | 2 days. |
| 3 | do | 0.02% of 10% solution dimethylaminostyrene in styrene. | 20 min. |
| 4 | do | None | 2 days. |
| 4 | do | 0.02% of a 10% solution of 50/50 copolymer dimethylaminostyrene/styrene in styrene. | 10 min. |

A typical polymer of the promoter as employed in my invention and illustrated in Examples 2 and 4 was prepared as follows: A suitable round bottom flask was charged with 5.0 parts N,N-dimethylaminostyrene
   5.0 parts styrene
   0.05 part azobisisobutyronitrile This solution was heated on a steam bath for a period of 2 hours. An additional 0.05 part of azobisisobutyronitrile was added and heating was continued for a period of about 12 to 15 hours. The clear, amber, solid product was dissolved in 10 parts of hot benzene and precipitated by pouring into 50 parts of methanol. The copolymer was air dried and finally dried in vacuo. The specific viscosity of a 1% solution in benzene at 25° C. was 0.23. In this example all parts are parts by weight.

The resinous compositions of my invention found particular use in the preparation of laminated articles composed of a filler impregnated with and bonded with the reaction product. In the preparation of the laminated articles, it is customary to impregnate or coat the filler with the liquid polymerizable mixture. These impregnated materials may then be plied together and formed to the desired shape. Heat is usually applied to raise the temperature of the polymerizable mixture to a point where the polymerization will take place. However, by the use of the promoters of my invention, it is possible to polymerize the reaction mixture at room temperature. In order to obtain a faster curing cycle, it is desirable in most cases to apply a slightly elevated temperature.

The resinous composition of my invention also finds employment where castings are to be prepared. In this case the polymerizable mixture is poured into a form of desired shape in which the material is allowed to cure either at room temperature or when subjected to elevated temperatures. In the production of laminated articles wherein the base material is impregnated with the resinous composition, the sheet material may be such as paper, cloth or fibrous glass. Other materials will be apparent to those skilled in the art. Additives such as dyes, pigments or other colorants may also be introduced into the resinous composition in order to obtain a cured product of any desired color. It will also be apparent that when castings are prepared utilizing the resinous composition both filled and unfilled articles may be produced.

I claim:

1. A resinous composition comprising the polymerizable mixture of (1) an ethylenically unsaturated polycarboxylic acid-polyhydric alcohol polyester resin, (2) a compound containing a polymerizable $CH_2=C<$ group and selected from the group consisting of styrene, side-chain alkyl styrenes, side-chain substituted halo styrenes, ring-substituted alkyl styrenes, ring-substituted halo styrenes, allyl compounds and methallyl compounds and having a boiling point of at least 60° C., an organic peroxide polymerization catalyst for (1) and (2), and (3) from about 0.005% to 0.2% by weight based on the total weight of the resinous composition of a member selected from the group consisting of (a) a compound having the general formula:

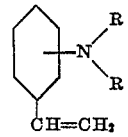

wherein R is an alkyl group containing from 1 to 4 carbon atoms and (b) polymers of (a).

2. A resinous composition comprising the polymerizable mixture of (1) an ethylenically unsaturated polycarboxylic acid-polyhydric alcohol polyester resin, (2) styrene, an organic peroxide polymerization catalyst for (1) and (2), and (3) from about 0.005% to 0.2% by weight based on the total weight of the resinous composition of a member selected from the group consisting of (a) a compound having the general formula:

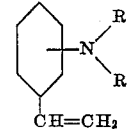

wherein R is an alkyl group containing from 1 to 4 carbon atoms and (b) polymers of (a).

3. A resinous composition comprising the polymerizable mixture of (1) an ethylenically unsaturated polycarboxylic acid-polyhydric alcohol polyester resin, (2) p-methyl styrene, an organic peroxide polymerization catalyst for (1) and (2), and (3) from about 0.005% to 0.2% by weight based on the total weight of the resinous composition of a member selected from the group consisting of (a) a compound having the general formula:

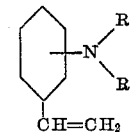

wherein R is an alkyl group containing from 1 to 4 carbon atoms and (b) polymers of (a).

4. A resinous composition comprising the polymerizable mixture of (1) an ethylenically unsaturated polycarboxylic acid-polyhydric alcohol polyester resin, (2) o-methyl styrene, an organic peroxide polymerization catalyst for (1) and (2), and (3) from about 0.005% to 0.2% by weight based on the total weight of the resinous composition of a member selected from the group consisting of (a) a compound having the general formula:

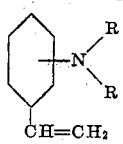

wherein R is an alkyl group containing from 1 to 4 carbon atoms and (b) polymers of (a).

5. A resinous composition comprising the polymerizable mixture of (1) an ethylenically unsaturated polycarboxylic acid-polyhydric alcohol polyester resin, (2) styrene, an organic peroxide polymerization catalyst for (1) and (2), and (3) from about 0.005% to 0.2% by weight based on the total weight of the resinous composition of dimethyl amino styrene.

6. A resinous composition comprising the polymerizable mixture of (1) an ethylenically unsaturated polycarboxylic acid-polyhydric alcohol polyester resin, (2) p-methyl styrene, an organic peroxide polymerization catalyst for (1) and (2), and (3) from about 0.005% to 0.2% by weight based on the total weight of the resinous composition of dimethyl amino styrene.

7. A resinous composition comprising the polymerizable mixture of (1) an ethylenically unsaturated polycarboxylic acid-polyhydric alcohol polyester resin, (2) o-methyl styrene, an organic peroxide polymerization catalyst for (1) and (2), and (3) from about 0.005% to 0.2% by weight based on the total weight of the resinous composition of dimethyl amino styrene.

8. A resinous composition comprising the polymerizable mixture of (1) an ethylenically unsaturated polycarboxylic acid-polyhydric alcohol polyester resin, (2) styrene, an organic peroxide polymerization catalyst for (1) and (2), and (3) from about 0.005% to 0.2% by weight based on the total weight of the resinous composition of dimethyl amino styrene-styrene copolymer.

9. A resinous composition comprising the polymerizable mixture of (1) an ethylenically unsaturated polycarboxylic acid-polyhydric alcohol polyester resin, (2) o-methyl styrene, an organic peroxide polymerization catalyst for (1) and (2), and (3) from about 0.005% to 0.2% by weight based on the total weight of the resinous composition of dimethyl amino styrene-styrene copolymer.

References Cited in the file of this patent

UNITED STATES PATENTS

| | | |
|---|---|---|
| 2,480,928 | Hurdis | Sept. 6, 1949 |
| 2,600,457 | Wynstra | June 17, 1952 |